United States Patent
Hertel et al.

(10) Patent No.: US 9,994,104 B2
(45) Date of Patent: Jun. 12, 2018

(54) SYSTEM AND METHOD OF REACTING TO WHEEL SLIP IN A TRACTION VEHICLE

(71) Applicant: Deere & Company, Moline, IL (US)

(72) Inventors: Benjamin J. Hertel, S. Coffeyville, OK (US); Clayton G. Janasek, Independence, KS (US); Jeffrey L. Theusch, Dubuque, IA (US)

(73) Assignee: DEERE & COMPANY, Moline, IL (US)

( * ) Notice: Subject to any disclaimer, the term of this patent is extended or adjusted under 35 U.S.C. 154(b) by 0 days. days.

(21) Appl. No.: 14/845,190

(22) Filed: Sep. 3, 2015

(65) Prior Publication Data

US 2017/0066324 A1    Mar. 9, 2017

(51) Int. Cl.
| | |
|---|---|
| *A01B 63/11* | (2006.01) |
| *B60K 28/16* | (2006.01) |
| *B60W 30/18* | (2012.01) |
| *A01B 63/114* | (2006.01) |
| *A01B 63/112* | (2006.01) |

(52) U.S. Cl.
CPC ............ *B60K 28/16* (2013.01); *A01B 63/112* (2013.01); *A01B 63/1145* (2013.01); *B60W 30/18172* (2013.01); *B60Y 2200/41* (2013.01)

(58) Field of Classification Search
CPC .. B60K 17/356; B60K 23/0808; B60K 28/16; B62D 6/00; B62D 9/002; B62D 12/00; E02F 3/76; E02F 3/84; E02F 5/32; E02F 9/2025; E02F 9/2029; A01B 63/112; A01B 63/1145; B60W 30/18172

USPC .............. 172/2–11, 699; 180/197, 243, 308; 701/1, 29.2, 50, 52, 69
See application file for complete search history.

(56) References Cited

U.S. PATENT DOCUMENTS

| | | |
|---|---|---|
| 3,913,680 A | 10/1975 | Carlson |
| 4,037,544 A | 7/1977 | Cantone |
| 4,157,118 A | 6/1979 | Suganami et al. |
| 4,177,870 A | 12/1979 | Henn |
| 4,518,044 A * | 5/1985 | Wiegardt .............. A01B 67/00 172/3 |
| 4,846,283 A | 7/1989 | Batcheller |

(Continued)

FOREIGN PATENT DOCUMENTS

| | | |
|---|---|---|
| DE | 1937314 | 2/1971 |
| DE | 3017570 | 11/1981 |

(Continued)

OTHER PUBLICATIONS

Office Action from the US Patent and Trademark Office for U.S. Appl. No. 14/845,186 dated Jan. 27, 2017 (11 pages).

(Continued)

*Primary Examiner* — Robert E Pezzuto
(74) *Attorney, Agent, or Firm* — Michael Best & Friedrich LLP

(57) ABSTRACT

A vehicle traction control system for a vehicle includes a prime mover, at least one wheel for providing tractive effort on a support surface, and a ground-engaging implement moveable relative to the support surface. The traction control system also includes a controller operable to monitor wheel slip of the at least one wheel. The controller is operable to move the ground-engaging implement at a rate proportional to an amount of wheel slip.

20 Claims, 4 Drawing Sheets

(56) References Cited

U.S. PATENT DOCUMENTS

| | | | |
|---|---|---|---|
| 5,147,010 A * | 9/1992 | Olson | B60K 23/0808 |
| | | | 180/197 |
| 5,505,267 A | 4/1996 | Orbach et al. | |
| 5,564,507 A | 10/1996 | Matsushita et al. | |
| 5,613,581 A | 3/1997 | Fonkalsrud et al. | |
| 5,684,691 A | 11/1997 | Orbach et al. | |
| 5,755,291 A * | 5/1998 | Orbach | A01B 63/112 |
| | | | 172/2 |
| 5,911,769 A | 6/1999 | Orbach et al. | |
| 6,119,786 A | 9/2000 | Creger et al. | |
| 6,144,910 A | 11/2000 | Scarlett et al. | |
| 6,162,146 A | 12/2000 | Hoefling | |
| 6,234,254 B1 | 5/2001 | Dietz et al. | |
| 6,317,676 B1 | 11/2001 | Gengler et al. | |
| 6,405,844 B1 | 6/2002 | Takamatsu | |
| 6,857,494 B2 * | 2/2005 | Kobayashi | B62D 12/00 |
| | | | 180/235 |
| 7,452,306 B2 | 11/2008 | Casey | |
| 7,734,398 B2 | 6/2010 | Manneppalli | |
| 7,770,681 B2 | 8/2010 | Marathe et al. | |
| 7,779,947 B2 | 8/2010 | Stratton | |
| 7,867,136 B2 | 1/2011 | Schifferer | |
| 7,974,756 B2 | 7/2011 | Ikari | |
| 8,060,284 B2 | 11/2011 | Hendryx | |
| 8,083,004 B2 * | 12/2011 | Knight, Jr. | E02F 3/84 |
| | | | 172/699 |
| 8,103,417 B2 | 1/2012 | Gharsalli et al. | |
| 8,175,785 B2 | 5/2012 | Turski et al. | |
| 8,540,048 B2 | 9/2013 | Will et al. | |
| 8,600,621 B2 | 12/2013 | Callaway et al. | |
| 8,626,404 B2 | 1/2014 | Thomson et al. | |
| 8,726,543 B2 | 5/2014 | Kelly | |
| 8,788,160 B2 | 7/2014 | Lorentz et al. | |
| 8,825,314 B2 | 9/2014 | Jensen | |
| 8,880,301 B2 | 11/2014 | Velde | |
| 8,983,739 B2 | 3/2015 | Faivre | |
| 9,086,104 B2 | 7/2015 | McCann et al. | |
| 9,213,331 B2 * | 12/2015 | Johnson | G05B 19/409 |
| 2001/0056319 A1 | 12/2001 | Rocke | |
| 2003/0121674 A1 | 7/2003 | Scarlett et al. | |
| 2004/0006957 A1 | 1/2004 | Owens | |
| 2006/0042838 A1 * | 3/2006 | Yeoman | B62D 9/002 |
| | | | 180/6.2 |
| 2006/0245896 A1 | 11/2006 | Alshaer et al. | |
| 2006/0287792 A1 | 12/2006 | Jarrett | |
| 2008/0234901 A1 | 9/2008 | Johnson et al. | |
| 2008/0234902 A1 | 9/2008 | Johnson et al. | |
| 2008/0257569 A1 | 10/2008 | Foster et al. | |
| 2008/0257570 A1 | 10/2008 | Keplinger et al. | |
| 2009/0223215 A1 | 9/2009 | Kelly et al. | |
| 2010/0009806 A1 | 1/2010 | Shirao et al. | |
| 2010/0174454 A1 | 7/2010 | Saito | |
| 2010/0300711 A1 | 12/2010 | Pirotais | |
| 2012/0133202 A1 | 5/2012 | Mui et al. | |
| 2012/0239260 A1 | 9/2012 | Ishikawa et al. | |
| 2012/0293316 A1 | 11/2012 | Johnson et al. | |
| 2013/0085036 A1 | 4/2013 | Anderson | |
| 2013/0103273 A1 | 4/2013 | von Schönebeck et al. | |
| 2013/0158804 A1 | 6/2013 | Callaway et al. | |
| 2013/0173122 A1 | 7/2013 | Liu et al. | |
| 2013/0289832 A1 | 10/2013 | Pirotais | |
| 2014/0005899 A1 | 1/2014 | Byers et al. | |
| 2014/0039772 A1 | 2/2014 | Jensen | |
| 2014/0121911 A1 | 5/2014 | Davis et al. | |
| 2014/0200775 A1 | 7/2014 | Shirao | |
| 2014/0277966 A1 | 9/2014 | Kelly | |
| 2014/0343800 A1 | 11/2014 | Nelson | |
| 2015/0120103 A1 | 4/2015 | Keys, II et al. | |
| 2015/0139767 A1 | 5/2015 | Moriki et al. | |
| 2015/0149054 A1 | 5/2015 | Gentle et al. | |
| 2015/0233094 A1 | 8/2015 | Maiyur | |
| 2016/0032564 A1 | 2/2016 | Pinther, II et al. | |
| 2016/0160470 A1 | 6/2016 | Kishimoto et al. | |

FOREIGN PATENT DOCUMENTS

| | | |
|---|---|---|
| DE | 3230330 | 2/1984 |
| DE | 3604218 | 2/1987 |
| DE | 4316421 | 11/1994 |
| DE | 69030503 | 10/1997 |
| DE | 19939442 | 2/2001 |
| DE | 10351376 | 5/2004 |
| DE | 102014206234 | 10/2015 |
| EP | 0241748 | 10/1987 |
| EP | 0338141 | 10/1989 |
| EP | 0500403 | 8/1992 |
| EP | 2556735 | 2/2013 |
| GB | 1086662 | 10/1967 |
| GB | 2428755 | 2/2007 |
| JP | H0790879 | 4/1995 |
| JP | H7090879 | 4/1995 |

OTHER PUBLICATIONS

Office Action from the US Patent and Trademark Office for U.S. Appl. No. 14/845,192 dated Jun. 8, 2017 (10 pages).

Office Action from the US Patent and Trademark Office for U.S. Appl. No. 14/845,192 dated Aug. 22, 2017 (6 pages).

Office Action from the US Patent and Trademark Office for U.S. Appl. No. 14/845,186 dated Jul. 27, 2017 (15 pages).

DE102016216587.9 Search Report from the German Intellectual Property Office dated May 10, 2017 (9 pages, which includes a Statement of Relevance).

DE102016216584.4 Search Report from the German Intellectual Property Office dated May 10, 2017 (9 pages, which includes a Statement of Relevance).

DE102016216588.7 Search Report from the German Intellectual Property Office dated May 10, 2017 (11 pages, which includes a Statement of Relevance).

DE102016216649.2 Search Report from the German Intellectual Property Office dated Jul. 19, 2017 (13 pages, which includes a Statement of Relevance).

Office Action from the U.S. Patent and Trademark Office for U.S. Appl. No. 14/845,186 dated Feb. 23, 2018 (20 pages).

* cited by examiner

SYSTEM AND METHOD OF REACTING TO WHEEL SLIP IN A TRACTION VEHICLE

BACKGROUND

The present disclosure relates to regulating wheel slip in a traction vehicle.

When a traction vehicle, such as a motor grader, is in low traction conditions, too much wheel slip can cause the vehicle to become less productive and can also degrade the quality of the support surface under the wheel. Poor tractive conditions have previously been addressed by limiting the torque to an electric drive motor, by applying individual wheel brakes to a slipping wheel, and by applying hydrostatic torque drive systems and infinitely variable hydraulic drive torque limiting systems. Other reactions to wheel slip are typically in the hands of the operator.

SUMMARY

Providing a method of automatic traction control for reduced wheel slip will improve the quality of the support surface left behind the vehicle, improve vehicle productivity, assist novice vehicle operators, and reduce the workload of experienced vehicle operators.

In one aspect, the disclosure provides a vehicle traction control system for a vehicle having a prime mover, at least one wheel for providing tractive effort on a support surface, and a ground-engaging implement moveable relative to the support surface. The traction control system also includes a controller operable to monitor wheel slip of the at least one wheel. The controller is operable to move the ground-engaging implement at a rate proportional to an amount of wheel slip.

In another aspect, the disclosure provides a method of regulating wheel slip in a traction vehicle including a prime mover, at least one wheel for providing tractive effort on a support surface, and a ground-engaging implement moveable relative to the support surface. The method also includes monitoring an amount of wheel slip of the at least one wheel, and controlling a rate of movement of the ground-engaging implement proportional to the amount of wheel slip.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and implementation of components set forth in the following description or illustrated in the following drawings. The disclosure is capable of other embodiments and of being practiced or of being carried out in various ways.

Figure 1A:
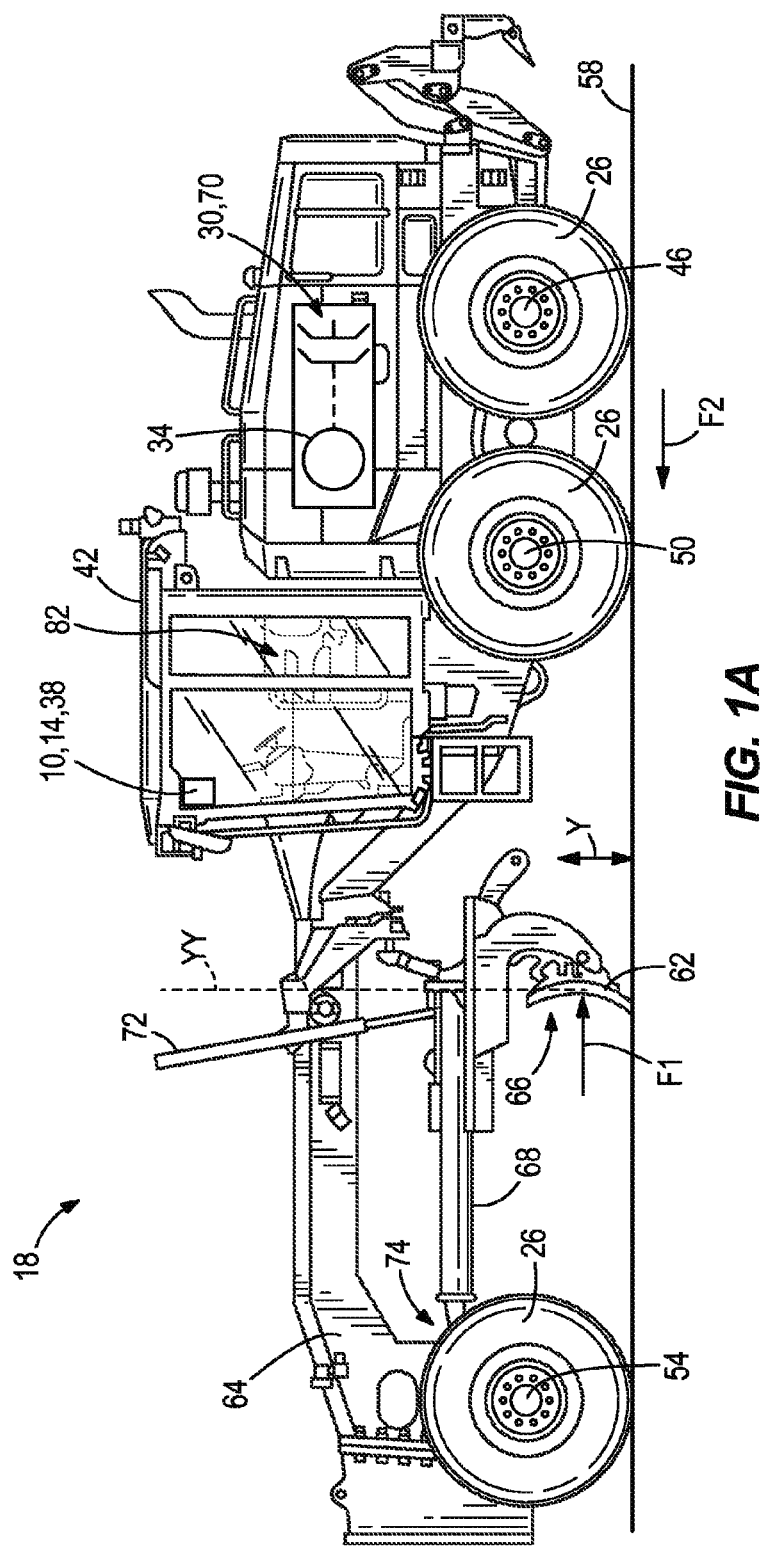
FIG. 1A is a traction vehicle with a traction control system in accordance with the present disclosure.
Figure 1B:
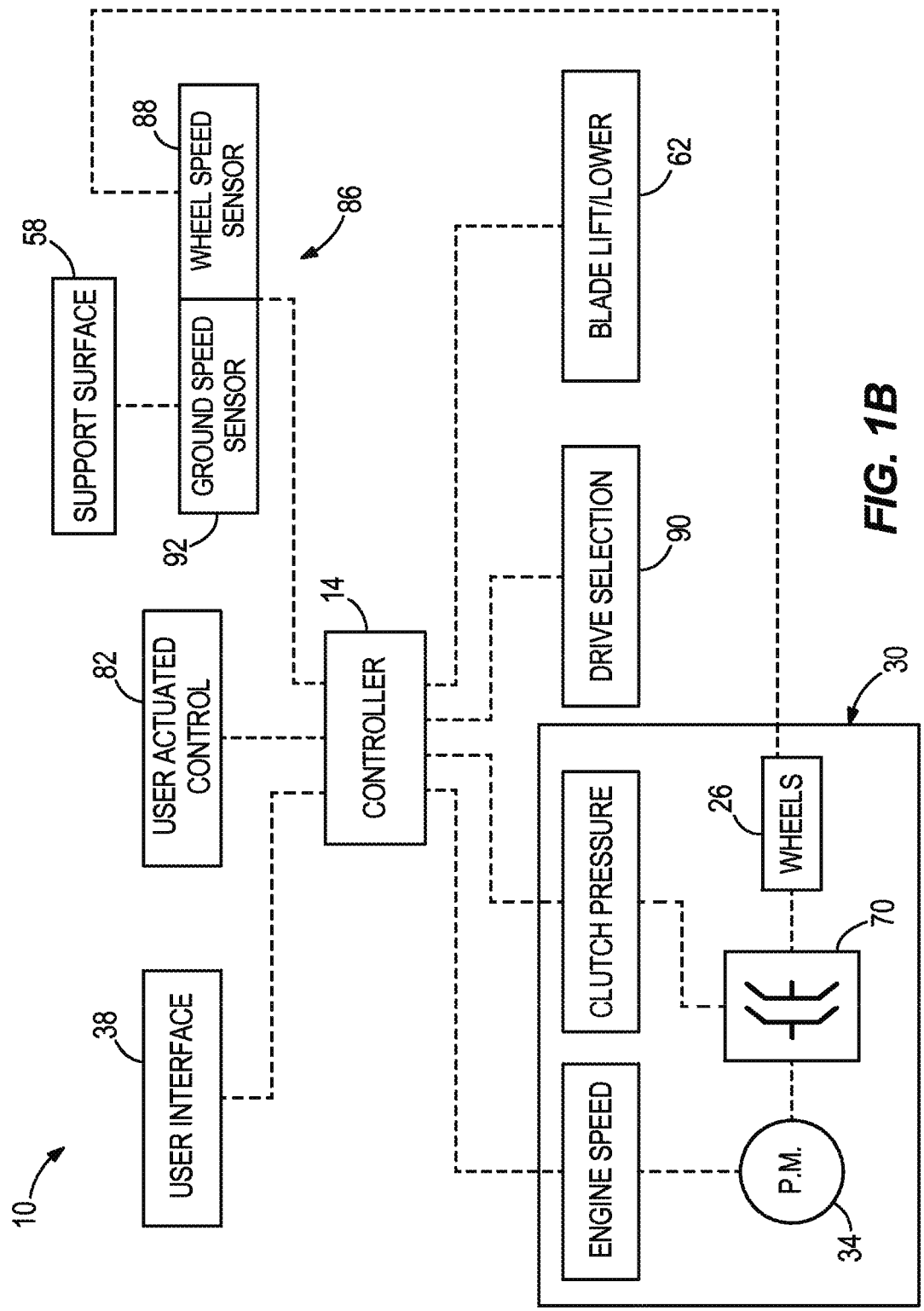
FIG. 1B is a schematic illustration of the traction control system for the traction vehicle of FIG. 1A.

A traction control system 10, illustrated schematically in FIG. 1B, having a controller 14 is described herein for a fraction vehicle 18. For example, the traction vehicle 18 may include a motor grader as shown in FIG. 1A. However, the traction control system 10 described herein is not limited in its application to motor graders and may be applied to other fraction vehicles. For example, the traction control system 10 can be used on vehicles such as but not limited to earth moving equipment, construction equipment, snow removal equipment, sand moving equipment, forestry harvesting equipment, agricultural equipment, cargo moving equipment, mining equipment, on highway equipment, automotive vehicles, etc. The traction control system 10 can also be used on other vehicles equipped with a ground-engaging implement that increases the load on the traction vehicle 18, as will be discussed in greater detail below.

By way of example, FIG. 1A illustrates the traction vehicle 18, e.g., a motor grader, having a plurality of axles 46, 50, 54 and a plurality of drive wheels 26, the axles and wheels driven by a drivetrain 30, which is driven by a prime mover 34. The traction vehicle 18 may have any number of axles and drive wheels. For example, the vehicle 18 may have a first axle 46, a second axle 50, a third axle 54, and six drive wheels 26 corresponding therewith, as illustrated. The drivetrain 30 may provide power to drive some or all of the wheels 26, e.g., only the rear wheels, both the front and rear wheels, etc. The drivetrain 30 may include a drive selection mechanism 90 to selectively drive the wheels such that a user may select which wheels are driven. For example, the rear wheels may normally be powered during normal operating conditions, and the front wheels may be selectively engaged to receive a portion of the transmission output torque from the rear wheels as desired. In other implementations, other wheels may be normally powered and selectively powered in any combination. The vehicle 18 may include drive wheels 26 having tires, continuous tracks, or other fraction devices that engage a support surface 58 (e.g., the ground). The drive wheels 26 interact directly with the support surface 58 and are responsible for vehicle 18 movement and tractive effort.

The drivetrain 30 includes a transmission 70, such as a single-speed or multi-speed transmission, or infinitely-variable transmission through direct coupling means, torque converter drives, hydrostatic drives, electric motor drives, or any other transmission known now or in the future to those having ordinary skill in the art. For the purpose of the examples used herein, a direct drive multi-speed transmission is used. However, application is not limited to a direct drive transmission system. The traction control system 10 can be applied to any power transmission system. Output power from the transmission drives the drive wheels 26 and may be geared directly to the drive wheels 26.

The prime mover 34 may include any power source to provide rotational driveline power, which includes an input power to the drivetrain 30. For example, the prime mover 34 may include, but is not limited to, an internal combustion engine, a piston engine, a rotary engine, a hydraulic motor, a hydrostatic system, an electric motor, etc. The term "engine" used throughout this document (e.g., as in "engine speed") refers generally to the prime mover 34 and is not limited to an engine or any particular type of prime mover.

The illustrated traction vehicle 18 includes an implement 62, such as a blade, located between the second and third axles 50, 54. The implement 62 is a ground engaging tool. For example, the blade scrapes the support surface 58 to flatten the support surface 58 during a grading operation. The implement 62 may include other implements such as a ripper, a scarifier, a front attachment, a plough, a sweeper, a shovel, etc., and the vehicle 18 may include one or more of said implements. The blade 62 is coupled to at least two attachment points on a frame 64 of the traction vehicle 18. In particular, a blade arm 68 coupled to the blade 62 is additionally coupled to the frame 64 by a plurality of hydraulic cylinders 72 (only one of which is shown in FIG. 1A) and by a pivot attachment point 74 located adjacent the third axle 54. The blade 62 is configured for movement generally up and down with respect to the support surface 58, e.g., in a direction Y generally normal to the support surface 58, towards and away from the support surface 58. In other words, the hydraulic cylinders 72 are operable to move the blade arm 68 in the direction Y, which in turn, moves the blade 62 in the direction Y. The blade 62 may also pivot along a vertical axis YY (e.g., normal to the support surface 58) for turning a face 66 of the blade 62 from the front towards the sides. In addition, the blade 62 may be pivotable about additional axes not disclosed in detail herein. The blade 62 may also be located in front of the forward-most axle (e.g., the third axle 54), behind the rearward-most axle (e.g., the first axle 46), or in between other axles.

A user-activated control 82 (e.g., a joystick control) is located within a cab 42 of the traction vehicle 18 and is operable for manual movement of the blade 62. In the illustrated implementation, the joystick control 82 moves radially in two opposing directions. The joystick control 82 is also biased in a neutral position. The neutral position corresponds to a stationary height of the blade 62 relative to the support surface 58. Stated another way, when the joystick control 82 is in the neutral position, the blade 62 does not move with respect to the frame 64. With movement of the joystick control 82 in a forward direction (e.g., away from an operator seated within the cab 42), the blade 62 lowers towards and/or into the support surface 58. In contrast, with movement of the joystick control 82 in a rearward direction (e.g., towards an operator seated within the cab 42), the blade 62 raises away from the support surface 58. The degree or the amount of movement of the user-activated control 82 from the neutral position corresponds to different rates of movement of the blade 62.

Referring again to FIGS. 1A and 1B, the traction vehicle 18 may have a user interface 38 for system operation, which may be located in the cab 42 of the fraction vehicle 18, another location on the vehicle, or remote from the vehicle (e.g., the user interface may be a personal portable device with wireless communication to the controller). The controller 14 receives input from the user interface 38, from the joystick control 82, and from a plurality of sensors 86 (FIG. 1B). The controller 14 also has outputs for controlling the prime mover 34, the transmission 70, power transmission drive selection 90 (e.g., to direct power to the rear wheels, the front wheels, all wheels, etc.), and the blade 62. Thus, the controller 14 is operatively coupled to the transmission 70, the prime mover 34, the blade 62, and the drive selection 90.

With reference to FIG. 1B, the sensors 86 include a wheel speed sensor 88 and a ground speed sensor 92. The ground speed sensor 92 may include a radar mechanism, global positioning system (GPS) or other suitable linear speed measurement sensor. The ground speed sensor 92 measures the speed of the traction vehicle 18 relative to the support surface 58 and sends a ground speed signal to the controller 14. The wheel speed sensor 88 measures the speed of at least one wheel that is powered by the transmission 70 and sends a wheel speed signal to the controller 14. The wheel speed may include a rotational speed or a linear speed (e.g., a linear speed at which the wheel would be moving based on its rotational speed with no wheel slip). The controller 14 includes a processor for making calculations, comparisons, and executing logic described in further detail below. Additional sensors 86 may be coupled to other features of the traction vehicle 18. For example, the sensors 86 may measure engine speed of the prime mover 34 and/or clutch pressure of the transmission 70.

As described below in further detail, during low fraction conditions when wheel slipping occurs, or occurs above a threshold, it may be desirable to control a rate of movement of the blade 62 to lessen the load on the traction vehicle 18. The present disclosure including the traction control system 10 describes a method of automatically managing wheel tractive effort and the rate of movement of the blade 62 relative to the support surface 58 by the controller 14.

In operation, the traction vehicle 18 moves along the support surface 58 in a first direction as the blade 62 is lowered into the support surface 58 by actuation of the joystick control 82 to perform a grading operation. As such, a force created by the support surface 58 acts on the blade 62, shown as a resultant force $F_1$, which is opposite from a force $F_2$ provided by the driven wheels 26 for movement of the traction device 18 along the support surface 58 (FIG. 1A). Generally, if the force $F_1$ is approximate or exceeds the force $F_2$ (acknowledging additional forces on the vehicle due to wind resistance, rolling friction, etc.), the driven wheels 26 will slip relative to the support surface 58.

Figure 2:
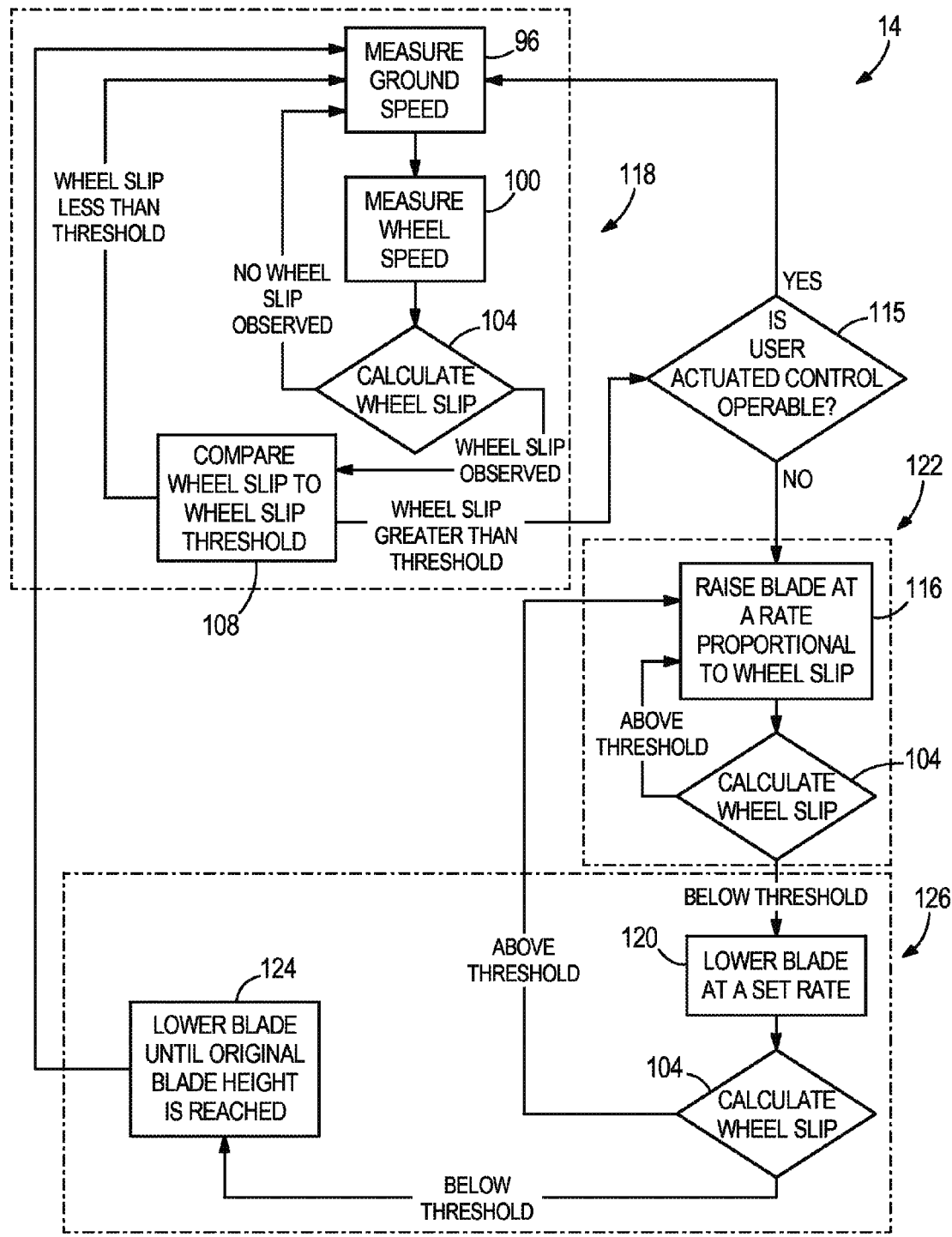
FIG. 2 is a flow chart illustrating a method of regaining traction of the traction vehicle once slip has occurred.

With reference to FIG. 2, the controller 14 logic of the traction control system 10 is illustrated. Steps of measuring the ground speed 96 via the ground speed sensor 92 and measuring the wheel speed 100 of the driven wheels 26 via the speed sensor 88 are first calculated to determine an actual wheel slip 104 of the traction vehicle 18. As one example, the controller 14 may calculate a speed difference by subtracting the ground speed 96 from the wheel speed 100 (which may, e.g., first be converted from a rotational wheel speed to a linear wheel speed as discussed above). The calculated wheel slip 104 may be measured in terms of a percentage, e.g., a percentage of the speed difference relative to wheel speed. When the wheel is not slipping, the wheel slip is 0%, and when the wheel is slipping completely without any traction at all, the wheel slip is 100%. In other implementations, the calculated wheel slip 104 may be quantified in other ways and expressed in other units, such as an absolute speed difference between ground speed and wheel speed.

Figure 3:
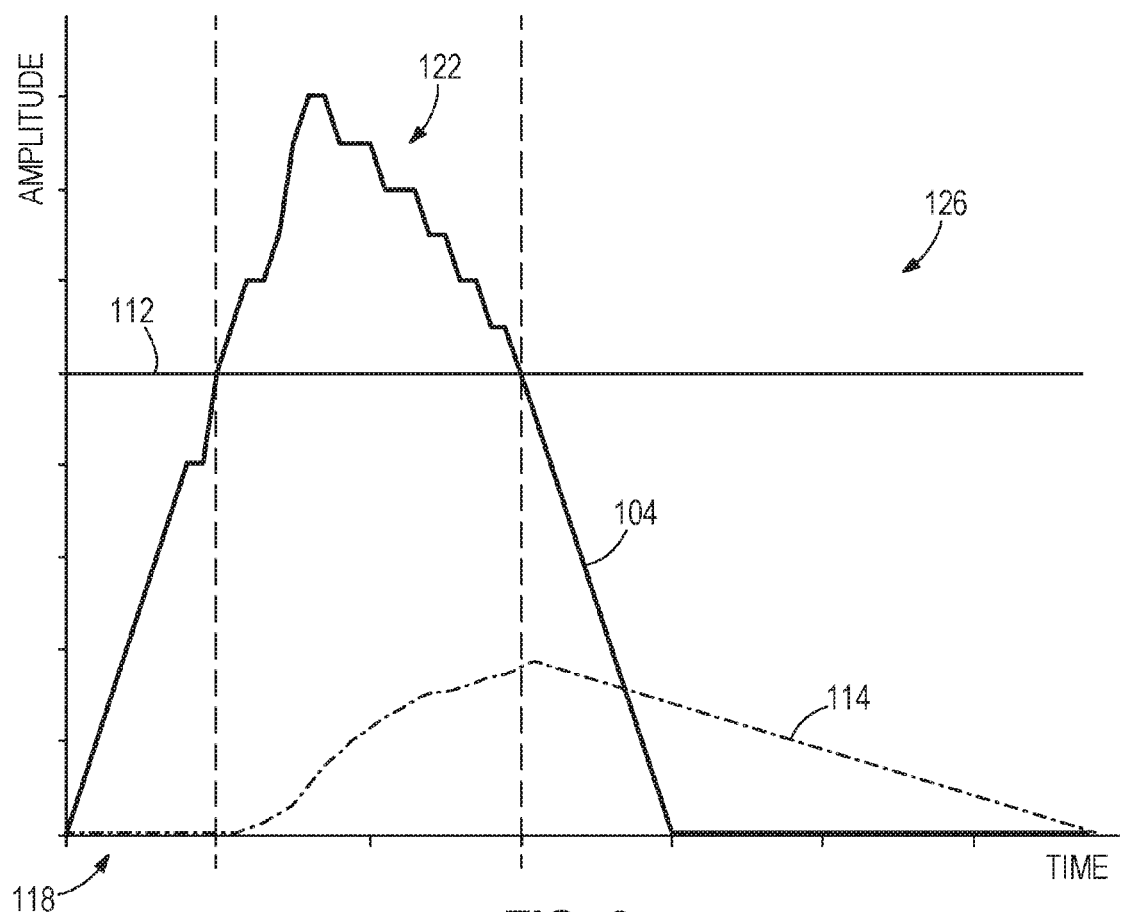
FIG. 3 is a graph illustrating a percent wheel slip and a height of a ground-engaging implement of a traction vehicle plotted against time.

If no wheel slip 104 is observed, then the controller 14 returns to step 96 until wheel slip 104 is observed. Once the wheel slip 104 is observed, a step 108 includes comparing the wheel slip 104 against a wheel slip threshold 112 (FIG. 3). The wheel slip threshold 112 is a programmed set point of wheel slip within the controller 14. In the illustrated implementation, the wheel slip threshold 112 is about 10% wheel slip; however, in other implementations, the wheel slip threshold 112 may be greater or less than 10%. If the wheel slip 104 is less than the wheel slip threshold 112, then the controller again returns to step 96. In further implementations, the wheel slip threshold 112 is selectively variable to adapt to different conditions of the support surface 58. For example, if the support surface 58 is of poor quality, which increases the chance of wheel slip, then the wheel slip threshold 112 can be lowered.

With reference to FIG. 3, amplitudes of the wheel slip 104 (e.g., percent slip) and a height of the blade 114 (e.g., inches) relative to the support surface 58 are plotted against time (e.g., minutes). An original position of the blade 62 initially set into the support surface 58 is represented by the horizontal axis of the graph. A first phase 118 of FIG. 3 corresponds to steps 96, 100, 104, 108 of FIG. 2 wherein the blade 62 is stationary at the original position as the wheel slip 104 increases.

To provide an operator of the traction vehicle 18 with maximum control over the movement of the blade 62, the actuation of the joystick control 82 overrides the controller 14. For example, once the joystick control 82 is actuated in either the forward (to lower the blade 62) or rearward (to raise the blade 62) direction, the controller 14 is disabled from interfering with the manual movement of the blade 62. Therefore, once the wheel slip 104 is greater than the wheel slip threshold 112, the controller 14 proceeds to step 115 to determine if the joystick control 82 is operable (FIG. 2). If the joystick control 82 is operating the movement of the blade 62, then the controller 14 again returns to step 96.

With continued reference to FIG. 2, if the joystick control 82 is positioned in the neutral position, the controller 14 proceeds to step 116 to automatically raise the blade 62 at a rate proportional to the wheel slip 104. A second phase 122 of FIG. 3 corresponding to steps 104, 116 of FIG. 2 is entered as the blade 62 increases in height relative to the original position of the blade 62. As long as the wheel slip is above the threshold 112, the controller 14 continues to raise the blade, even when the wheel slip 104 may begin to decrease. The second phase 122 illustrates the variability in raising rate of the blade 62 (e.g., the change of the height of the blade 114 in an incremental period of time or the slope of the curve representing the height of the blade 114 in FIG. 3) with respect to the difference in magnitude between the wheel slip 104 and the wheel slip threshold 112. In general, as the differential between the wheel slip 104 and the wheel slip threshold 112 increases, the raising rate of the blade 62 also increases.

Figure 4:
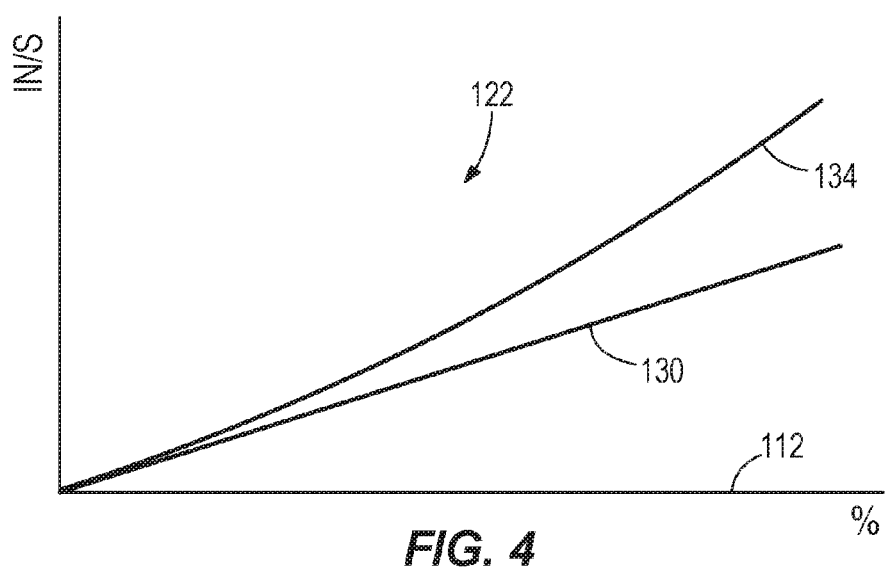
FIG. 4 is a graph illustrating percent wheel slip plotted against a raising rate of the ground-engaging implement of a traction vehicle.

In particular, two examples of the relationship between the amount of wheel slip 104 (illustrated on the horizontal axis) and the raising rate of the blade 62 (illustrated on the vertical axis) are shown in FIG. 4. The amount of wheel slip 104 is measured in percent (%) and the raising rate of the blade 62 is measured in inches per second (in/s). In one implementation, a linear relationship 130 defines the raising rate of the blade 62 and the amount of wheel slip 104. As the wheel slip 104 increases, the raising rate of the blade 62 also increases a directly proportional amount. In another implementation, a non-linear relationship 134, e.g., a quadratic relationship, defines the raising rate of the blade 62 proportional to the amount of wheel slip 104. In general, a linear relationship 130 may be utilized by the controller 14 when the support surface 58 is in a high traction condition (e.g., compacted soil), and a positive non-linear relationship 134 may be utilized by the controller 14 when the support surface 58 is in a low traction condition (e.g., loose soil). Sensitivity of the raising rate of the blade 62 is generally lower with the linear relationship 130 compared to a non-linear relationship such as illustrated by the curve 134. For example, with very loose traction conditions, wheel slip 104 can increase rapidly thereby warranting quick movement of the blade 62 to limit the wheel slip 104 and a non-linear rate increase in response. In other implementations, the linear relationship 130 and the non-linear relationship 134 may be combined, e.g., the raising rate begins with the linear relationship 130 before transitioning to the non-linear relationship 134 at a wheel slip threshold above the wheel slip threshold 112. With different traction vehicles 18 (e.g., earth moving equipment, snow removal equipment, sand moving equipment, forestry harvesting equipment, agricultural equipment, cargo moving equipment, mining equipment, on highway equipment, automotive vehicles, etc.) in combination with different ground-engaging implements 62 (e.g., ploughs, sweepers, shovels, rippers, etc.), the relationship between the wheel slip 104 and the raising rate of the blade 62 may change to more effectively increase traction of the specific application of the traction control system 10.

With reference to FIG. 2, once the wheel slip 104 is below the wheel slip threshold 112, the controller 14 continues to step 120, which includes lowering the blade 62 at a set rate which is programmed into the controller 14. Therefore, the rate of lowering the blade 62 is not dependent upon the wheel slip 104. If the wheel slip 104 again increases above the wheel slip threshold 112 during the lowering operation, however, the controller 14 will again raise the blade 62 at a rate proportional to the calculated wheel slip 104 (step 116). In contrast, if the wheel slip 104 continues to decrease relative to the wheel slip threshold 112, the controller 14 proceeds to step 124 to lower the blade 62 until the original position of the blade 62 is reached.

A third phase 126 of FIG. 3 corresponds to steps 120, 104, 124 of FIG. 2. The lowering rate of the blade 62 is a constant such that the height of the blade 114 is illustrated as a linear line, i.e., constant slope. In the illustrated implementation, the wheel slip 104 returns to zero percent before the height of the blade 114 reaches the original position. In other instances during operation, the height of the blade 114 may reach the original position before the wheel slip 104 returns to zero percent. Because the wheel slip 104 is dependent upon the traction between the support surface 58 and the wheels 26, the traction control system 10 could reenter the second phase 122 without the blade 62 or the wheel slip 104 returning, respectively, to the original position or zero percent if traction decreases. In other implementations, the lowering rate of the blade 62 may be dependent upon the wheel slip 104, as similarly discussed above relative to the raising rate of the blade 62.

As such, the traction control system 10 can reciprocate between the phases 118, 122, 126 during operation of the traction vehicle 18 dependent upon the condition of the support surface 58. For example, as the traction vehicle 18 moves along the support surface 58, the condition of the support surface 58 (e.g., varying degrees of traction) can occur, which can affect the wheel slip 104 fluctuating above and below the wheel slip threshold 112. In addition, at any time during operation of the fraction vehicle 18 when the joystick control 82 is actuated, the controller 14 will then be disabled giving full control of the movement of the blade 62 to the operator.

What is claimed is:

1. A vehicle traction control system for a vehicle having a prime mover, at least one wheel for providing tractive effort on a support surface, and a ground-engaging implement moveable relative to the support surface, the traction control system comprising:

an electronic controller configured to monitor wheel slip of the at least one wheel, wherein the controller is configured to move the ground-engaging implement at a rate based on an amount of wheel slip, wherein the controller is configured to provide at least two selectable relationships between the amount of wheel slip and the rate of movement of the ground-engaging implement, wherein a first relationship of the at least two selectable relationships is such that as the wheel slip increases, the rate of movement of the ground-engaging implement increases linearly, and wherein a second relationship of the at least two selectable relationships is such that as the wheel slip increases, the rate of movement of the ground-engaging implement increases non-linearly, and further wherein the controller is configured to select between the linear first relationship and the non-linear second relationship to effectuate a selected moving rate response.

2. The vehicle traction control system of claim 1, further comprising a wheel slip threshold, wherein the controller is operable to move the ground-engaging implement away from the support surface when the wheel slip is above the wheel slip threshold.

3. The vehicle traction control system of claim 2, wherein the controller is operable to maintain an original position of the ground-engaging implement relative to the support surface as the wheel slip increases toward the wheel slip threshold.

4. The vehicle traction control system of claim 3, wherein the controller is operable to move the ground-engaging implement towards the support surface when the wheel slip is below the wheel slip threshold.

5. The vehicle traction control system of claim 4, wherein the ground-engaging implement moves at a determined rate towards the support surface.

6. The vehicle traction control system of claim 1, further comprising a user actuated control configured to manually move the ground-engaging implement at a plurality of rates.

7. The vehicle traction control system of claim 6, wherein when the user actuated control moves the ground-engaging implement, the controller is disabled from moving the ground-engaging implement.

8. The vehicle traction control system of claim 1, wherein the controller is configured to select between the linear first relationship and the non-linear second relationship based on a condition of the support surface.

9. The vehicle traction control system of claim 1, wherein the controller is configured to move the ground-engaging implement using the linear first relationship in a first condition of the support surface and is configured to move the ground-engaging implement using the non-linear second relationship in a second condition of the support surface, wherein the second condition includes a looser support surface than the first condition.

10. The vehicle traction control system of claim 1, wherein the second relationship is a quadratic relationship.

11. A method of regulating wheel slip in a traction vehicle having a prime mover, at least one wheel for providing tractive effort on a support surface, and a ground-engaging implement moveable relative to the support surface, the method comprising:
monitoring an amount of wheel slip of the at least one wheel; and
automatically controlling a rate of movement of the ground-engaging implement based on the amount of wheel slip, wherein the automatically controlling includes 1) selectively moving the ground-engaging implement such that as the wheel slip increases, the rate of movement of the ground-engaging implement increases linearly and 2) selectively moving the ground-engaging implement such that as the wheel slip increases, the rate of movement of the ground-engaging implement increases non-linearly.

12. The method of claim 11, wherein monitoring the amount of wheel slip includes measuring a ground speed of the traction vehicle, measuring a wheel speed of the at least one wheel, and computing the amount of wheel slip with the ground speed and the wheel speed.

13. The method of claim 11, further comprising comparing the amount of wheel slip with a wheel slip threshold.

14. The method of claim 13, further comprising moving the ground-engaging implement away from the support surface when the amount of wheel slip is greater than the wheel slip threshold.

15. The method of claim 13, further comprising moving the ground-engaging implement towards the support surface when the amount of wheel slip is less than the wheel slip threshold.

16. The method of claim 11, further comprising overriding a controller that automatically controls the rate of movement of the ground-engaging implement when manual control of the ground-engaging implement is initiated.

17. The method of claim 14, further comprising maintaining an original position of the ground-engaging implement relative to the support surface as the amount of wheel slip increases toward the wheel slip threshold.

18. The method of claim 11, further comprising selecting between the linear first relationship and the non-linear second relationship based on a condition of the support surface.

19. The method of claim 11, further comprising selecting the linear first relationship for operation on the support surface if the support surface is in a first condition and selecting the non-linear second relationship for operation on the support surface if the support surface is in a second condition, wherein the second condition includes a looser support surface than the first condition.

20. The method of claim 11, wherein the second relationship is a quadratic relationship.

* * * * *